No. 791,944. PATENTED JUNE 6, 1905.
W. M. PUGH.
COKE GRAPPLE.
APPLICATION FILED NOV. 4, 1904.

2 SHEETS—SHEET 1.

Witnesses
R. A. Boswell.
R. H. Bishop.

Inventor
William M. Pugh,
By Davis & Davis,
Attorneys.

No. 791,944. PATENTED JUNE 6, 1905.
W. M. PUGH.
COKE GRAPPLE.
APPLICATION FILED NOV. 4, 1904.

2 SHEETS—SHEET 2.

Witnesses
R. A. Boswell.
R. H. Bishop.

Inventor
William M. Pugh,
By Davis & Davis,
Attorneys.

No. 791,944.

Patented June 6, 1905.

UNITED STATES PATENT OFFICE.

WILLIAM M. PUGH, OF POCAHONTAS, VIRGINIA, ASSIGNOR OF ONE-HALF TO J. T. SANDERS, OF POCAHONTAS, VIRGINIA.

COKE-GRAPPLE.

SPECIFICATION forming part of Letters Patent No. 791,944, dated June 6, 1905.

Application filed November 4, 1904. Serial No. 231,458.

*To all whom it may concern:*

Be it known that I, WILLIAM M. PUGH, a citizen of the United States of America, and a resident of Pocahontas, county of Tazewell, State of Virginia, have invented certain new and useful Improvements in Coke-Grapples, of which the following is a full and clear specification, reference being had to the accompanying drawings, in which—

Figure 1:
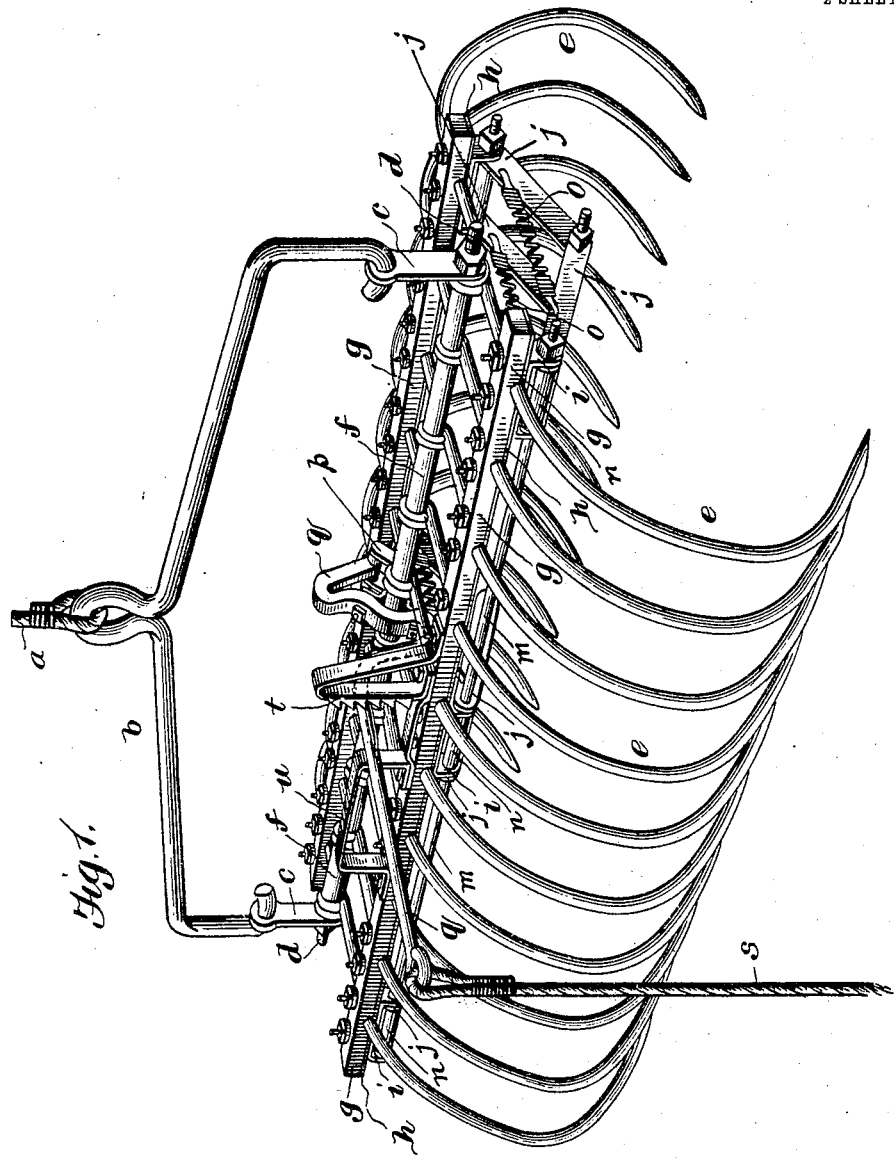
Figure 2:
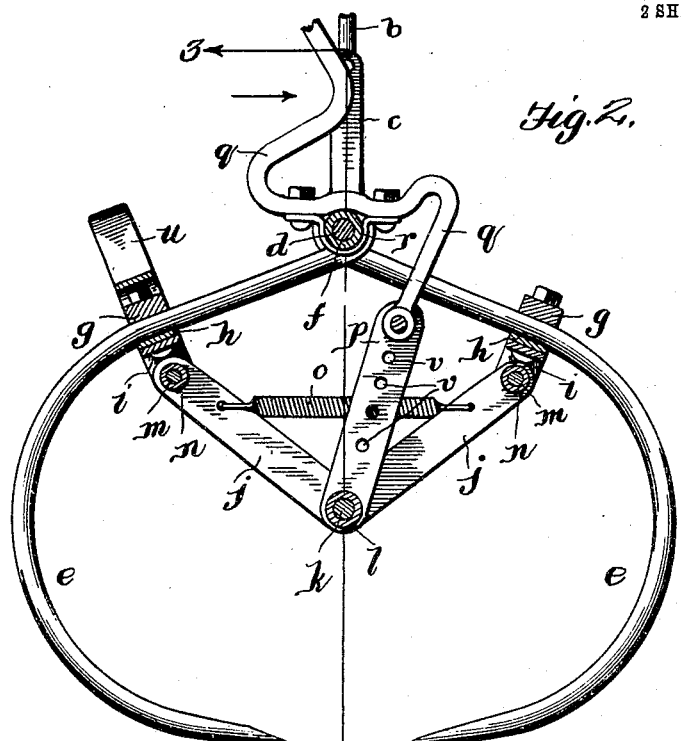
Figure 3:
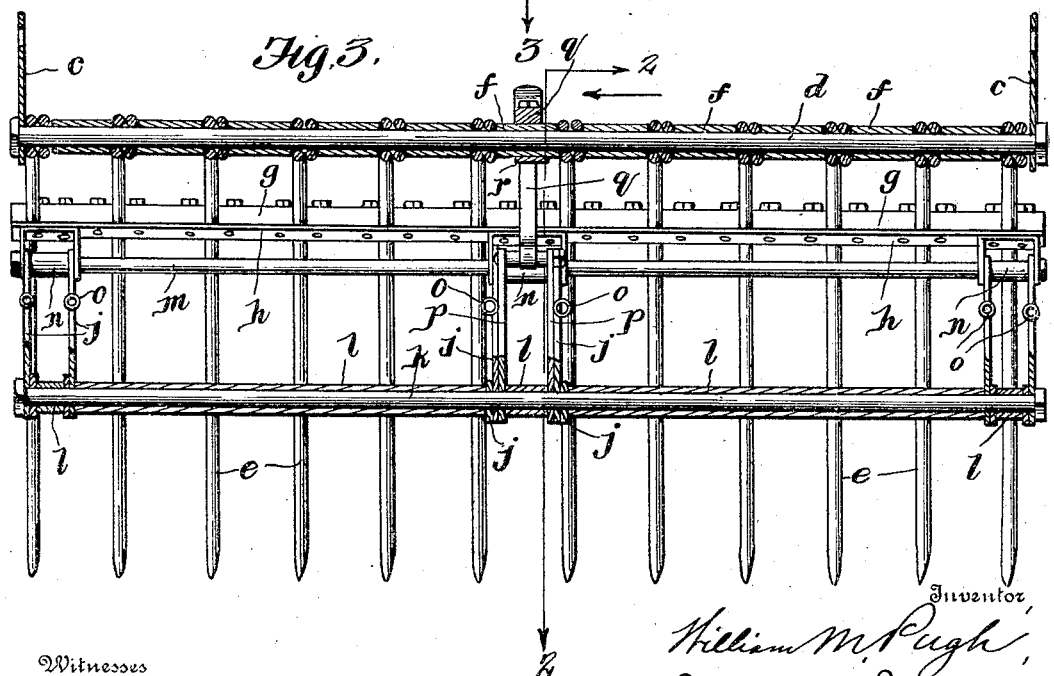

Figure 1 is a perspective view of the grapple open; Fig. 2, a transverse vertical sectional view showing it closed, and Fig. 3 a vertical longitudinal section on the line 3 3 of Fig. 2.

The object of this invention is to provide a simple and durable device which will be especially adapted for hoisting coke into freight-cars and which to that end is rendered easily operable and of large capacity, as more fully hereinafter set forth.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

The hoisting rope or chain $a$ is connected to a bail $b$, whose ends are connected pivotally, by means of depending links $c$, with the respective ends of a rod $d$, running the full length of the grapple.

The tines $e$ are connected at their upper inner ends by eyes formed at their ends to said rod $d$, the eyes being properly spaced on the rod by a series of short spacing-tubes $f$. There are two series of tines, one extending to one side of the rod and the other extending to the other side, and both series curve downward and inwardly, as shown. The tines of each series are further braced and spaced by a rod $g$, into whose lower edge the tines are notched, being held in these notches by the plates $h$, bolted on the under side of the bar.

Pivotally connected to each of the bars by depending brackets $i$ are three pairs of links $j$, which incline inwardly and downwardly and are pivotally connected together along the center of the grapple by means of a round rod $k$, the lower ends of the links being properly spaced by suitable tube-sections $l$ slipped on the rod. The pivots of the upper ends of the links consist, preferably, of parallel rods $m$, one rod serving as the pivot for one series of links and the other rod serving as the pivot for the series at the other side. To properly space the upper ends of each pair of links, a sleeve $n$ is slipped on rod $m$ between each pair of links.

With the foregoing construction it will be observed that to spread the tine-sections to open the grapple it is simply necessary to lift rod $k$—that is, bring it nearer to the parallel rod $d$—and vice versa to close the grapple— that is, bring the lower pointed ends of the tines together or near together. I keep the grapple normally closed by means of a series of coiled springs $o$, connecting opposite pairs of links $j$ at a point above the rod $k$, and in order to open or spread the tine-sections I pivotally connect to the center of rod $k$ a pair of links $p$, and to the upper ends of these links I pivotally connect the lower end of the opening-lever $q$, which is pivotally mounted on rod $d$ about midway the length of the rod by being clamped by a suitable clip $r$ to one of the spacing-sleeves $f$. The free end of this lever $q$ extends outward beyond the tines and is adapted to have attached to it a trip cord or chain $s$.

When the free end of the lever is pulled down by the trip-cord or by hand, the rod $k$ is raised through the medium of links $j$, thereby spreading or opening the tine-section, as shown in Fig. 1. To hold the parts in this opened position, I provide a ratchet $t$ on one of the bars $g$, into which the sharpened edge of the lever $q$ is engaged, thereby locking the sections open against the tendency of the springs $o$ to close them. To close the grapple, it is simply necessary to disengage the lever $q$ from the ratchet, whereupon the springs will close the grapple upon any material that is confined between the sets of tines, and should the springs fail to close the grapple their action may be assisted by an attendant. A guard $u$ is mounted on bar $g$ adjacent to the ratchet $t$ to assist in guiding the lever into engagement with the ratchet. A series of holes $v$ is provided in each of the links $p$ in order that the depending end of lever $q$ may be adjustably connected to said links, whereby the opposite sets of tines may be made to approach each other as near as may be necessary to prevent the material being handled from falling out of the grapple when the same is raised.

I propose using my grapple in connection with a truck or motor-vehicle which may be moved about from place to place as occasion may demand. The truck or vehicle will be provided with the usual mechanism for winding up and paying out the hoisting-rope with a swinging boom of the usual construction. In this way the grapple will be especially adapted for loading coke into railway-cars standing on a track adjacent to the pile of coke.

It will be apparent to those skilled in the art that various embodiments of the invention are possible, and I therefore do not wish to be limited to the exact arrangement and construction shown.

What I claim, and desire to secure by Letters Patent, is--

1. In combination, a central longitudinal rod and means connected to it for suspending it, tines pivotally connected to the rod and extending out in opposite directions, a bar connecting each series of said tines, a series of links pivotally connected to each of said bars, and extending downward and inward, a rod connecting the lower inner ends of these links, springs connecting these links above the connecting-rod, a lever pivotally mounted on the tine-carrying rod, means for pivotally connecting one end of this lever to the link-carrying rod, and means for locking this lever when it is drawn down to elevate the rod connecting the lower end of the links, substantially as set forth.

2. In combination, a central longitudinal rod and means connected to it for suspending it, tines pivotally connected to the rod and extending out in opposite directions, a bar connecting each series of said tines, a series of links pivotally connected to each of said bars, and extending downward and inward, a rod connecting the lower inner ends of these links, a lever pivotally mounted on the tine-carrying rod, means for pivotally connecting one end of this lever to the link-carrying rod, and means for locking this lever when it is drawn down to elevate the rod connecting the lower end of the links, substantially as set forth.

3. In an apparatus of the class described, a main rod running longitudinally of the device, means connected to this rod for suspending it, tines pivotally connected to this rod and extending outwardly therefrom in opposite directions, a bar connecting each series of tines, a link pivoted to the under side of each bar and extending downwardly and inwardly, means pivotally connecting the inner ends of these links together, and means for raising and lowering the pivotally-connected ends of said links.

4. In an apparatus of the class described, a main rod running longitudinally of the device, means connected to this rod for suspending it, tines pivotally connected to this rod and extending outwardly therefrom in opposite directions, a bar connecting each series of tines, a link pivoted to the under side of each bar and extending downwardly and inwardly, means pivotally connecting the inner ends of these links together, and means for raising and lowering the pivotally-connected ends of said links, said means being mounted upon the aforesaid main rod.

5. In an apparatus of the class described, a main rod running longitudinally of the device, means connected to this rod for suspending it, tines pivotally connected to this rod and extending outwardly therefrom in opposite directions, a bar connecting each series of tines, a link pivoted to the under side of each bar and extending downwardly and inwardly, means pivotally connecting the inner ends of these links together, and means for raising and lowering the pivotally-connected ends of said links, said means consisting of a lever pivotally mounted upon said rod, means connecting one end of this lever to the pivotally-connected ends of the links, and means for locking the lever.

6. In an apparatus of the class described, a main rod running longitudinally of the device, means connected to this rod for suspending it, tines pivotally connected to this rod and extending outwardly therefrom in opposite directions, a bar connecting each series of tines, a link pivoted to the under side of each bar and extending downwardly and inwardly, means pivotally connecting the inner ends of these links together, and means for raising and lowering the pivotally-connected ends of said links, and a spring connecting said links together at a point above their pivotally-connected ends.

In testimony whereof I hereunto affix my signature, in the presence of witnesses, this 26th day of October, 1904.

W. M. PUGH.

Witnesses:
 W. M. MINTER,
 J. T. $\times$ SANDERS,
   his mark
 J. B. MARTIN.